(12) United States Patent
Burke-Aguero et al.

(10) Patent No.: US 11,917,084 B2
(45) Date of Patent: Feb. 27, 2024

(54) CRYPTOGRAPHIC VALIDATION OF MEDIA INTEGRITY

(71) Applicant: MICROSOFT TECHNOLOGY LICENSING, LLC, Redmond, WA (US)

(72) Inventors: Rebecca Nicole Burke-Aguero, Seattle, WA (US); Samuel John Wenker, Kirkland, WA (US); Andrew Lee Jenks, Woodinville, WA (US); Isha Sharma, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/818,164

(22) Filed: Aug. 8, 2022

(65) Prior Publication Data

US 2023/0052755 A1    Feb. 16, 2023

Related U.S. Application Data

(62) Division of application No. 16/750,872, filed on Jan. 23, 2020, now Pat. No. 11,431,512.

(60) Provisional application No. 62/916,114, filed on Oct. 16, 2019.

(51) Int. Cl.
| | |
|---|---|
| H04L 29/06 | (2006.01) |
| G06F 21/00 | (2013.01) |
| H04L 9/32 | (2006.01) |
| H04L 9/30 | (2006.01) |
| G06F 21/64 | (2013.01) |
| H04L 9/08 | (2006.01) |

(52) U.S. Cl.
CPC ............ *H04L 9/3268* (2013.01); *G06F 21/64* (2013.01); *H04L 9/0825* (2013.01); *H04L 9/3073* (2013.01); *H04L 9/3242* (2013.01)

(58) Field of Classification Search
None
See application file for complete search history.

(56) References Cited

U.S. PATENT DOCUMENTS

| | | | | |
|---|---|---|---|---|
| 7,707,405 | B1 * | 4/2010 | Gilman | H04L 63/062 |
| | | | | 713/173 |
| 8,417,954 | B1 * | 4/2013 | Sagal | G06F 21/64 |
| | | | | 713/176 |
| 10,664,574 | B1 * | 5/2020 | Powers | G06F 21/6218 |
| 11,066,164 | B1 * | 7/2021 | Tsong | H04L 9/3263 |

(Continued)

*Primary Examiner* — Lisa C Lewis
(74) *Attorney, Agent, or Firm* — Newport IP, LLC; Jacob P. Rohwer

(57) ABSTRACT

Described herein is a system and method for validating media integrity using asymmetric key cryptography utilizing a public/private cryptographic key pair. The private key is kept secret and is known to an originator and/or publisher of a media file. The public key is added to the media file and is used to validate integrity of the media file, that is, that content of the media file (e.g., portion(s), frame(s)) has not been altered since publication of the media file. By validating integrity of the media file, strong proof that the media file came from an owner of the keypair (e.g., had possession of the private key) can be obtained, for example, resolving issues of trust and/or authenticity common in altered content. In some embodiments, information regarding an origin of the content can further be determined.

20 Claims, 16 Drawing Sheets

(56) References Cited

U.S. PATENT DOCUMENTS

| | | | | |
|---|---|---|---|---|
| 2002/0095589 A1* | 7/2002 | Keech | H04L 67/06 |
| | | | 713/189 |
| 2006/0031941 A1* | 2/2006 | Xiao | H04L 63/0823 |
| | | | 726/27 |
| 2010/0268952 A1* | 10/2010 | Chung | H04L 9/3236 |
| | | | 713/176 |
| 2011/0028209 A1* | 2/2011 | Nguyen | G06F 21/6209 |
| | | | 713/176 |
| 2013/0117822 A1* | 5/2013 | Soulez | G06Q 20/385 |
| | | | 726/4 |
| 2014/0208105 A1* | 7/2014 | Carapelli | G06F 21/57 |
| | | | 713/168 |
| 2014/0304515 A1* | 10/2014 | Feuerman | H04L 63/123 |
| | | | 713/176 |
| 2017/0255779 A1* | 9/2017 | Caklovic | G06F 21/54 |
| 2017/0344758 A1* | 11/2017 | Matsuo | H04L 9/30 |
| 2019/0114401 A1* | 4/2019 | De | G06F 21/51 |
| 2019/0354709 A1* | 11/2019 | Brinskelle | G06F 21/31 |
| 2020/0004695 A1* | 1/2020 | Anderson | H04L 67/1097 |
| 2020/0076609 A1* | 3/2020 | Minematsu | H04L 9/0643 |

\* cited by examiner

CRYPTOGRAPHIC VALIDATION OF MEDIA INTEGRITY

RELATED APPLICATION

This application is a divisional of U.S. patent application Ser. No. 16/750,872, filed Jan. 23, 2020, which claims priority to U.S. Provisional Application No. 62/916,114, filed Oct. 16, 2019, entitled "Cryptographic Validation of Media Integrity", the disclosures of which are hereby incorporated by reference in their entirety.

BACKGROUND

Computer software for altering audio/video has greatly improved and become increasingly available. This technology can be used to alter audio and/or video content to create seemingly real audio and/or video content sometimes referred to as "deepfake" content. Frequently, deepfake content has been maliciously attributed as originating from a reputable source. Malicious attribution can be problematic for consumer(s) of the deepfake content and/or the reputable source purported to be the originator of the deepfake content.

SUMMARY

Described herein is a media publishing system, comprising: a computer comprising a processor and a memory having computer-executable instructions stored thereupon which, when executed by the processor, cause the computer to: obtain a certificate comprising a public key of an asymmetric public/private key pair and a certificate signature; obtain the private key of the asymmetric public/private key pair; insert file integrity information for a media file in the media file, wherein the integrity information comprises the certificate; for each of a plurality of portions of the media file: calculate a hash value for the particular portion of the media file; store the calculated hash value for the particular portion of the media file in the media file in a portion integrity box associated with the particular portion of the media file; encrypt the calculated hash value for the particular portion of the media file with the private key; and store the encrypted calculated hash value for the particular portion of the media file in the media file as a signature of the calculated hash value for the particular portion of the media file in the portion integrity box associated with the particular portion of the media file.

Also described herein is a method of verifying media integrity of a media file, comprising: receiving a media file; within the received media file, identifying file integrity information for the media file, the file integrity information comprising a certificate comprising a public key, and, a certificate signature; validating the identified file integrity information based, at least in part, upon the certificate signature and the public key; for each of a plurality of portions of the media file: identifying portion integrity information for a particular portion of the media file within the media file, the portion integrity information comprising a stored hash value for the particular portion of the media file and a signed hash value for the particular portion of the media file; calculating a hash value for the particular portion of the media file; determining whether or not the stored hash value for the particular portion of the media file is valid by comparing the calculated hash value for the particular portion of the media file with the stored hash value for the particular portion of the media file; decrypting the signed hash value for the particular portion of the media file using the public key; determining whether or not the signed hash value for the particular portion of the media file is valid by comparing the calculated hash value for the particular portion of the media file with the decrypted signed hash value for the particular portion of the media file; and when it is determined that the signed hash value and the stored hash value are valid, provide information indicating that the hash value for the particular portion of the media file is valid.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
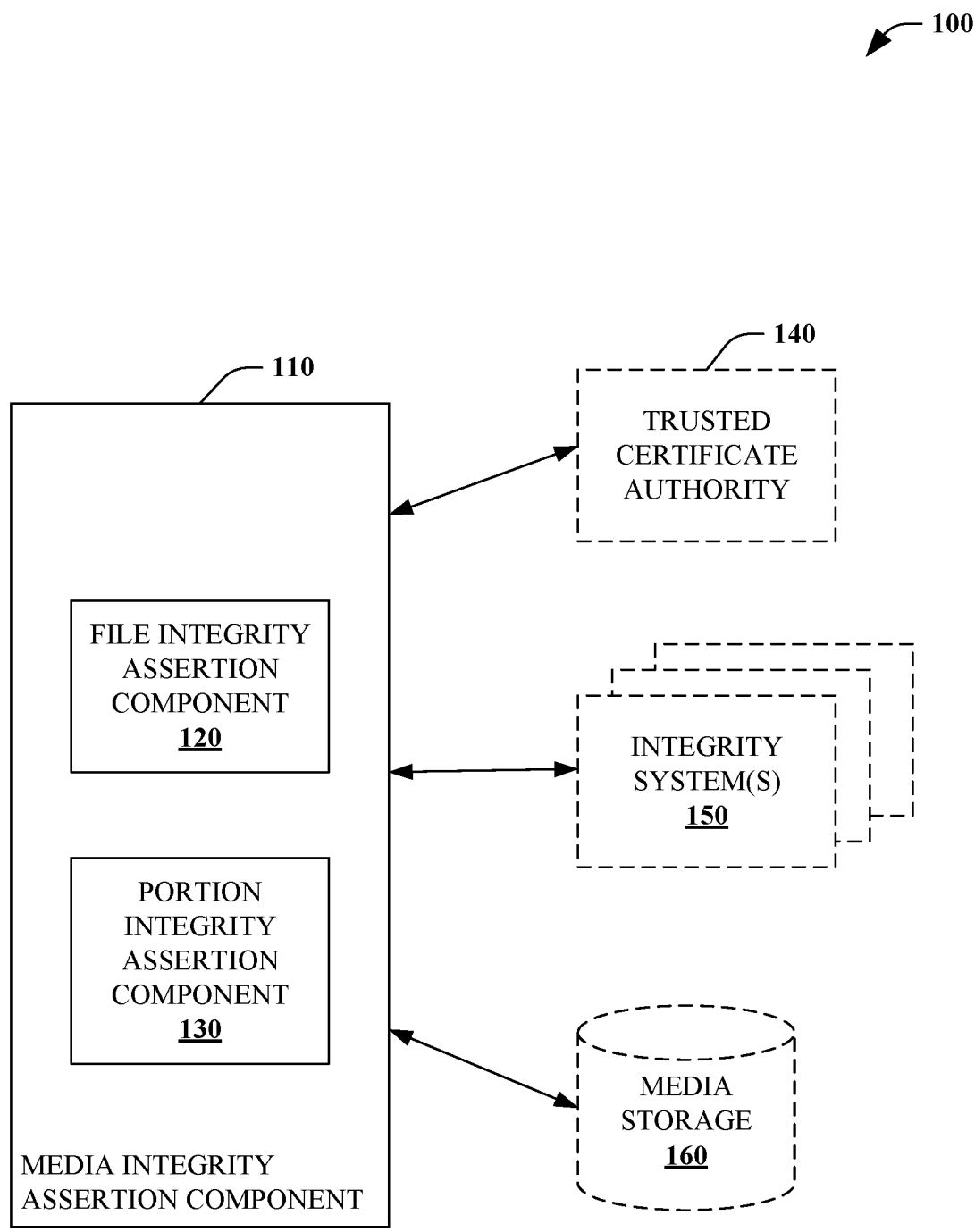
FIG. 1 is a functional block diagram that illustrates a media publishing system.

Various technologies pertaining to cryptographic validation of media integrity are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding cryptographic validation of media integrity. What follows are one or more exemplary systems and methods.

Aspects of the subject disclosure pertain to the technical problem of validating media integrity. The technical features associated with addressing this problem involve obtaining a certificate comprising a public key of an asymmetric public/private key pair and a certificate signature, wherein the certificate signature is based, at least in part, upon encryption of the public key using a private key of the asymmetric public/private key pair; obtaining the private key of the asymmetric public/private key pair; inserting file integrity information for a media file in the media file, wherein the integrity information comprises the certificate; for each a plurality of portions of the media file: calculating a hash value for the particular portion of the media file; storing the calculated hash value for the particular portion of the media file in the media file in a portion integrity box associated with the particular portion of the media file; encrypting the calculated hash value for the particular portion of the media file with the private key; and storing the encrypted calculated hash value for the particular portion of the media file in the media file as a signature of the calculated hash value for the particular portion of the media file in the portion integrity box associated with the particular portion of the media file. Accordingly, aspects of these technical features exhibit technical effects of more efficiently and effectively asserting integrity of a media file and/or validating integrity of the media file, for example, reducing consumption of computer resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Described herein is a system and method for validating media integrity using asymmetric key cryptography. Asymmetric key cryptography utilizes a public/private cryptographic key pair. The private key is kept secret and is known to an originator and/or publisher of the media content (e.g., audio and/or video content). The public key is added to a media file (e.g., media content) and is used to validate integrity of the media file, that is, that content of the media file (e.g., portion(s), frame(s)) has not been altered since publication of the media file. By validating integrity of the media file, strong proof that the media file came from an owner of the keypair (e.g., had possession of the private key) can be obtained, for example, resolving issues of trust and/or authenticity common in altered content. In some embodiments, information regarding an origin of the content can further be determined.

Referring to FIG. 1, a media publishing system 100 is illustrated. With the system 100, a publisher of media content can assert integrity of a media file (e.g., media content) using asymmetric key cryptography. In this manner, a consumer of the media file can validate integrity of the media file and/or verify an origin of the media file for which integrity has been asserted using the system 100. The system 100 includes a media integrity assertion component 110 having a file integrity assertion component 120 and a portion integrity assertion component 130.

The file integrity assertion component 120 can obtain a public key and a private key of an asymmetric public/private key pair. In some embodiments, the public key is a component of a certificate issued by a trusted certificate authority 140. In some embodiments, the certificate can be a secure sockets layer (SSL) certificate or an X.509 certificate. In some embodiments, the certificate can be a component of a certificate chain structure.

In some embodiments, the file integrity assertion component 120 can further obtain and/or generate a certificate signature. In some embodiments, the certificate signature is based, at least in part, upon encryption of the public key using the private key of the asymmetric public/private key pair. A variety of cryptographic algorithms may be used, including, but not limited to, Advanced Encryption Standard (AES), Data Encryption Standard (DES), Rivest-Shamir-Adleman (RSA), and Elliptic Curve Cryptography (ECC), among others.

The file integrity assertion component 120 can insert integrity information for the media file (e.g., a file integrity box) in the media file. In some embodiments, the integrity information comprises the public key and, optionally, the certificate signature. In some embodiments, the integrity information comprises one or more of a system type, a certificate, an algorithm, and/or additional data required to calculate hash for individual portion(s) (e.g., samples, frames) in the media file and to sign that hash.

For purposes of explanation and not limitation, a definition of an exemplary file integrity box includes a box type of "uuid", a box extended type, and a container of "movie box" ("moov"). Syntax of an exemplary file integrity box is set forth in Table 1:

TABLE 1 aligned(8) class FileIntegrityBox extends FullBox('uuid', 994d1d11fa004b0a860179a32a35a3fd, version=0, flags=0)
{
   unsigned int(8)[16]                    system_type;
   unsigned int(8)                       hashing_algorithm;
   unsigned int(8)                       signing_algorithm;
   unsigned int(8)                       certificate_type;
   unsigned int(8)                       certificate_size;
   unsigned int(8)[certificate_size]   certificate;
   unsigned int(8)                       per_sample_hash_size;
   unsigned int(8)                       per_sample_signature_size;
   unsigned int(8)                       per_sample_data_size;
}

The parameters/fields of the exemplary file integrity box of Table 1 can be defined as follows. "Version" is inherited from the FullBox structure and, in some embodiments, is zero. "Flags" is inherited from the FullBox structure and, in some embodiments, is zero. "System_type" specifies a universally unique identifier (UUID) that uniquely identifies a particular integrity system 150 being used.

"Hashing_algorithm" specifies a particular hashing algorithm which was used to hash each sample. In some embodiments, this value is specific to an integrity system. A hashing algorithm yields a one-way encryption of data (referred to as a hash). Exemplary hashing algorithms include SHA1, SHA2, SHA256, SHA384, SHA512, MD5, BLAKE2, Keccak, and/or GOST.

"Signing_algorithm" specifies the encryption algorithm which was used to sign each sample hash. In some embodiments, this value is specific to an integrity system. Exemplary encryption algorithms include RSA algorithms, and Diffie-Hellman algorithms.

"Certificate_type" specifies the type of certificate being used. In some embodiments, this value is specific to an integrity system. Exemplary certificates include the formats of X.509 (and its versions), General Certificates (GC), Public Key Infrastructure (PKI), Simple Public Key Infrastructure (SPKI), XML Key Management Specification (XKMS) and the like.

"Certificate_size" specifies the size in bytes of the certificate member. In some embodiments, this value is not zero. "Certificate" holds information regarding the certificate (e.g., public key and certificate signature) used to sign hashes. In some embodiments, this value is specific to an integrity system.

"Per_sample_hash_size" specifies the size in bytes of the hash member of the sample integrity box (discussed below). In some embodiments, this value is not zero. "Per_sample_signature_size" specifies the size in bytes of the signature member of the sample integrity box. In some embodiments, this value is not zero. "Per_sample_data_size" specifies the size in bytes of the data member of the sample integrity box. In some embodiments, this value may be zero.

With continued reference to FIG. 1, the portion integrity assertion component 130 can calculate a hash value for a portion of the media file (e.g., a frame) and, optionally, store the calculated hash value for the portion of the media file in the media file. In some embodiments, the hash is calculated using a predefined hashing algorithm. In some embodiments, the hash is calculated using a hashing algorithm specified in the file integrity box.

In some embodiments, the following data can be used to create a hash for a single portion (e.g., sample):
1. Complete contents of the 'stbl' box (path: moov.trak.mdia.minf.stbl).
2. Complete contents of the 'tfhd' box (path: moof.traf.tfhd).
3. Complete contents of the 'tfdt' box (path: moof.traf.tfhd).
4. Complete contents of the 'trun' box (path: moof.traf.trun).
5. The portion of the 'mdat' box for the given sample based on the offset data in the 'trun' box.

In some embodiments, depending on the hashing algorithm used, only a "partial" hash of a subset of the data (e.g. 1-4) is maintained once for an entire 'moof' and only hash the 'mdat' portion again as each sample is processed.

The portion integrity assertion component 130 can further encrypt the calculated hash value with the private key. In some embodiments, encryption is performed using a predefined hashing algorithm. In some embodiments, encryption is performed using an encryption algorithm specified in the file integrity box (e.g., signing_algorithm).

The portion integrity assertion component 130 can store the encrypted calculated hash value in the media file as a signature of the calculated hash value for the portion of the media file. In some embodiments, the information stored by the portion integrity assertion component 130 can be referred to as a sample integrity box. In some embodiments, the sample integrity box can include the hash of the portion of the media file (e.g., sample data) and a signature of that hash.

For purposes of explanation and not limitation, a definition of an exemplary sample integrity box includes a box type of "uuid", a box extended type, and a container of track fragment box ("traf") or track box ("trak'") with "traf" for fmp4, and "trak" for full track. Syntax of an exemplary sample integrity box is set forth in Table 2:

TABLE 2

```
aligned(8) class SampleIntegrityBox extends FullBox('uuid',
469d22dfe1924defa71ef4c9f2ce3e71, version=0, flags=0)
{
    unsigned int(8)[16]                        system_type;
    unsigned int(32)                           sample_count;
    {
        unsigned int(8)[per_sample_hash_size]       hash;
        unsigned int(8)[per_sample_signature_size]  signature;
        unsigned int(8)[per_sample_data_size]       data;
    }[sample_count]
}
```

The parameters/fields of the exemplary sample integrity box of Table 2 can be defined as follows. "Version" is inherited from the FullBox structure and, in some embodiments, is zero. "Flags" is inherited from the FullBox structure and, in some embodiments, is zero. "Sample_count" is the number of integrity-supporting samples in the containing track or track fragment. This value, in some embodiments, is the total number of samples in the track or track fragment.

"System_type" specifies a UUID that uniquely identifies the integrity system being used. This value, in some embodiments, is equal to a value specified in a FileIntegrityBox for the particular media file. "Hash" specifies the hash of the sample data. In some embodiments, when the sample data is encrypted (e.g., per ISO/IEC 23001-7:2015), this is a hash of the encrypted sample data and not the clear sample data. "Signature" specifies the signature of the hash. "Data" holds the integrity system specific data. In some embodiments, the media integrity assertion component 110 can store the media file in a media store 160.

Figure 2:
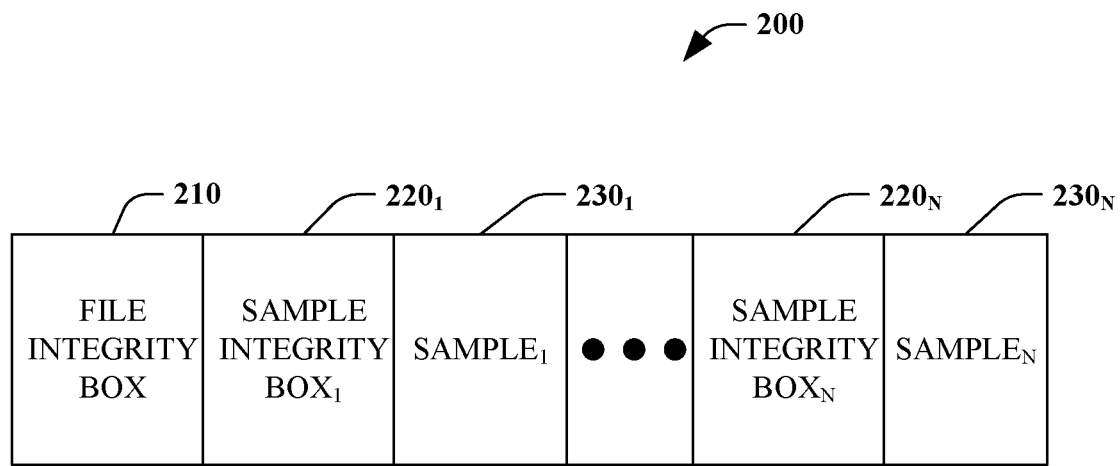
FIG. 2 is a diagram of an exemplary media file.

Turning briefly to FIG. 2, an exemplary media file 200 is illustrated. For purposes of illustration and not limitation, the media file 200 can be produced by the media integrity assertion component 110. The media file 200 includes a file integrity box 210 and one or more sample integrity boxes 220 (e.g., portion integrity boxes). In some embodiments, a particular sample integrity box 220 precedes a corresponding sample 230, that is, sample integrity boxes 220 are interwoven with samples 230. In some embodiments, a particular sample integrity box 220 follows a corresponding sample 230. In some embodiments, sample integrity boxes 220 for the media file 200 are stored separately from the corresponding samples 230, for example, in a data structure before and/or after the samples 230.

Figure 3:
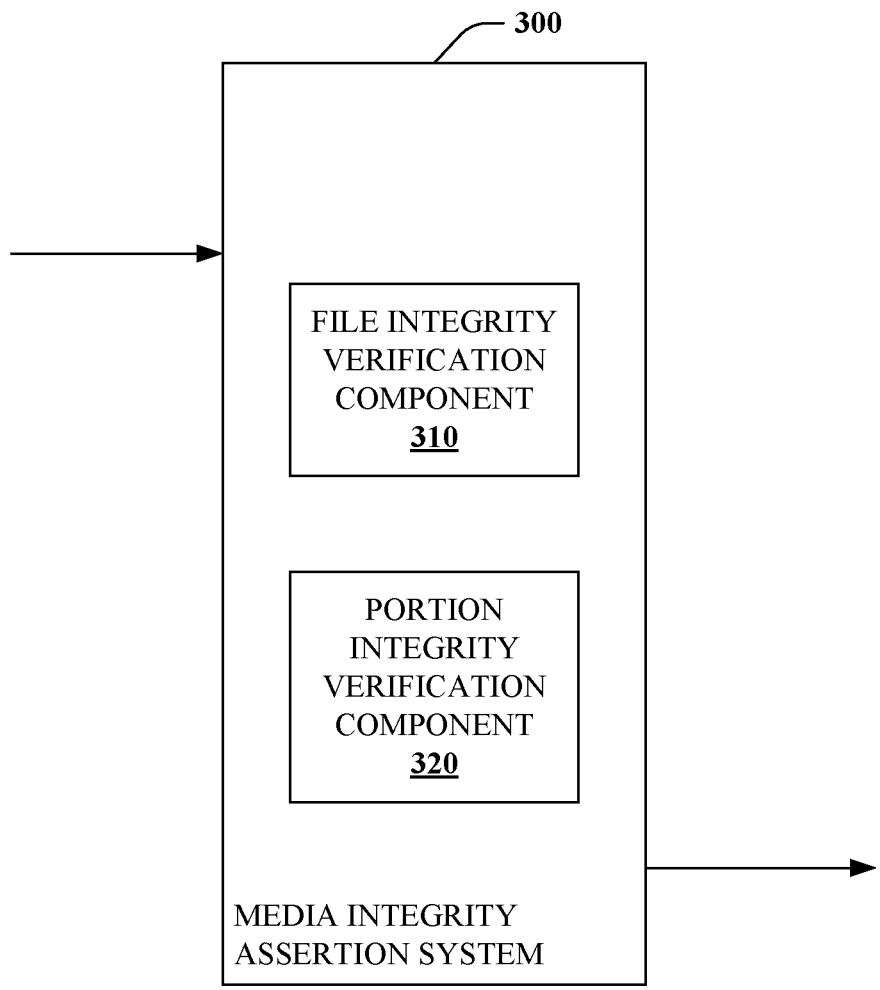
FIG. 3 is a functional block diagram that illustrates a media integrity verification system.

Next, referring to FIG. 3, a media integrity verification system 300 is illustrated. With the system 300, a consumer (e.g., user) of media content can verify integrity of media content (e.g., received media file) using asymmetric key cryptography. The system 300 includes a file integrity verification component 310 and a portion integrity verification component 320.

The file integrity verification component 310 can identify integrity information (e.g., a file integrity box) within the media file. In some embodiments, the integrity information includes a public key to be used for verification of an origin of the media file. In some embodiments, the integrity information includes a certificate comprising a public key and a signature (e.g., certificate signature and/or entity signature).

In some embodiments, the file integrity verification component 310 can validate the identified integrity information based, at least in part, upon the signature (e.g., entity signature and/or certificate signature) and the public key. In some embodiments, the file integrity verification component 310 can utilize a decryption algorithm (e.g., specified in the file integrity box) to decrypt the signature using the public key. If the result of decryption matches the public key, the file integrity verification component 310 can confirm that the certificate is properly signed.

The portion integrity verification component 320 can identify integrity information for a portion of the media file (e.g., one, some or all frames of the media file) within the media file. In some embodiments, the integrity information includes a stored hash value for the portion of the media file (e.g., one, some or all frames of the media file). In some embodiments, the integrity information includes a signed hash value for the particular portion of the media file.

The portion integrity verification component 320 can calculate a hash value for the particular portion of the media file. In some embodiments, the portion integrity verification component 320 can compare the calculated hash value for the particular portion of the media file with the stored hash value. When the values are not the same, the portion integrity verification component 320 can determine that the media file has been altered. In some embodiments, the media integrity verification system 300 can provide information to an application and/or user (e.g., via a graphical user interface) indicating that the media file has been altered.

The portion integrity verification component 320 can decrypt the signed hash value using the public key and compare the decrypted value with the calculated hash value for the portion of the media file. When the values are not the same, the portion integrity verification component 320 can determine that the media file has been altered. In some embodiments, the media integrity verification system 300 can provide information to an application and/or user (e.g., via a graphical user interface) indicating that the media file has been altered.

When the values are the same, the portion integrity verification component 320 can determine that the signed hash value is valid, and provide information indicating that the signed hash value for the portion of the media file is valid. In some embodiments, for a first portion (e.g., frame) of the media file, the portion integrity verification component 320 can determine an identifier of an origin of the media file based, at least in part, upon information stored in and/or accessible via the certificate (e.g., from the trusted certificate authority 140).

FIGS. 4-15 illustrate exemplary methodologies relating to cryptographic validation of media integrity. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 4:
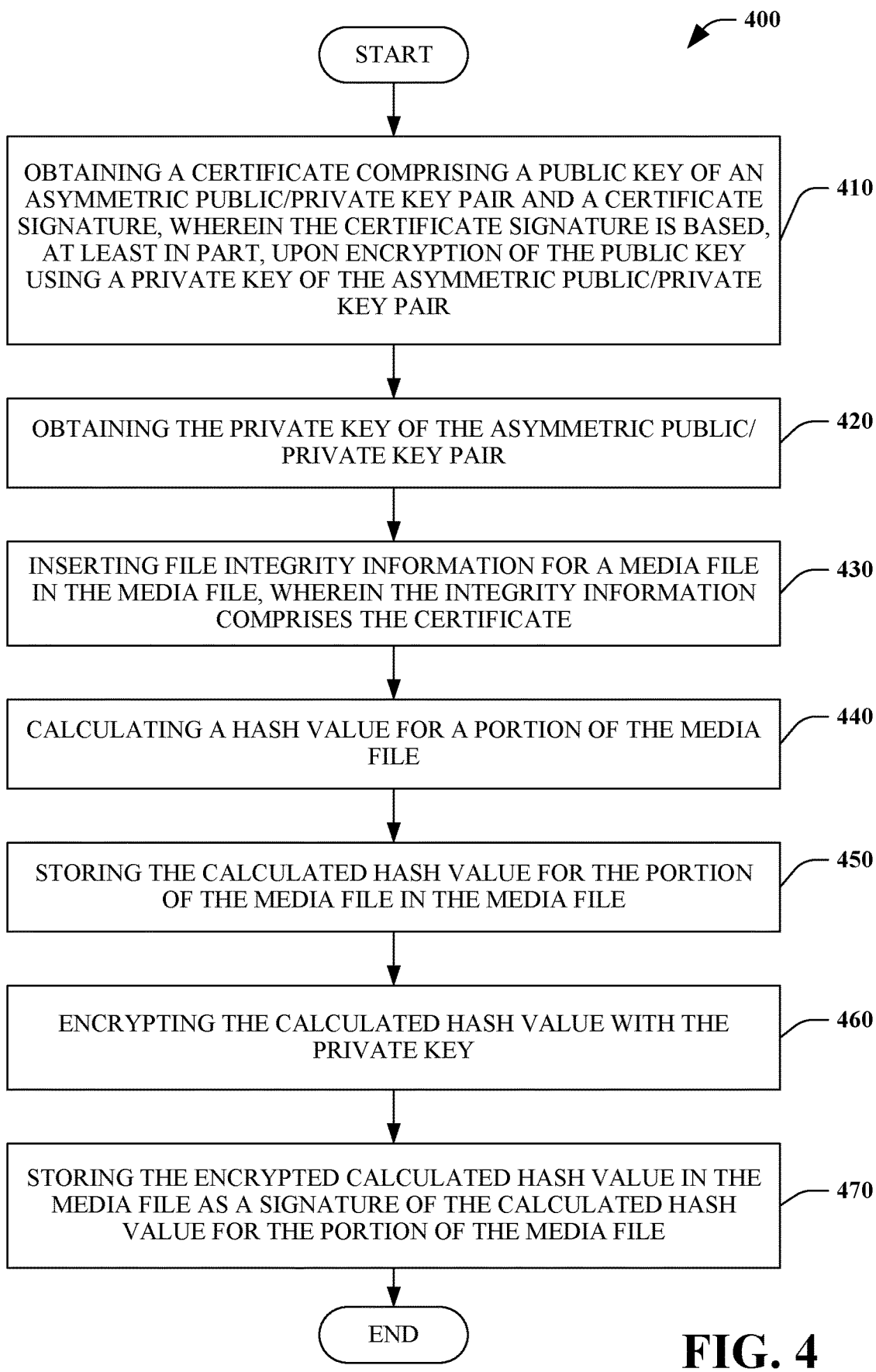
FIG. 4 is a flow chart that illustrates a method of asserting integrity of a media file.

Referring to FIG. 4, a method 400 of asserting integrity of a media file is illustrated. In some embodiments, the method 400 is performed by the media integrity assertion component 110.

In some embodiments, an integrity system of a plurality of integrity systems can be determined/decided/selected. Selection of the integrity system can determine one or more values of the file integrity box, for example, hashing algorithm, signing algorithm, certificate type, certificate size, certificate, per sample hash size, per sample signature size, and/or per sample data size.

At 410, a certificate comprising a public key of an asymmetric public/private key pair and a certificate signature is obtained. The certificate signature is based, at least in part, upon encryption of the public key using a private key of the asymmetric public/private key pair. At 420, the private key of the asymmetric public/private key pair is obtained.

At 430, file integrity information (e.g., a file integrity box) for a media file is inserted in the media file. The integrity information comprises the certificate. At 440, a hash value is calculated for a portion of the media file. At 450, the calculated hash value for the portion of the media file is stored in the media file (e.g., in a portion integrity box).

At 460, the calculated hash value is encrypted with the private key. At 470, the encrypted calculated hash value is stored in the media file as a signature of the calculated hash value for the portion of the media file (e.g., in a portion integrity box).

Figure 5:
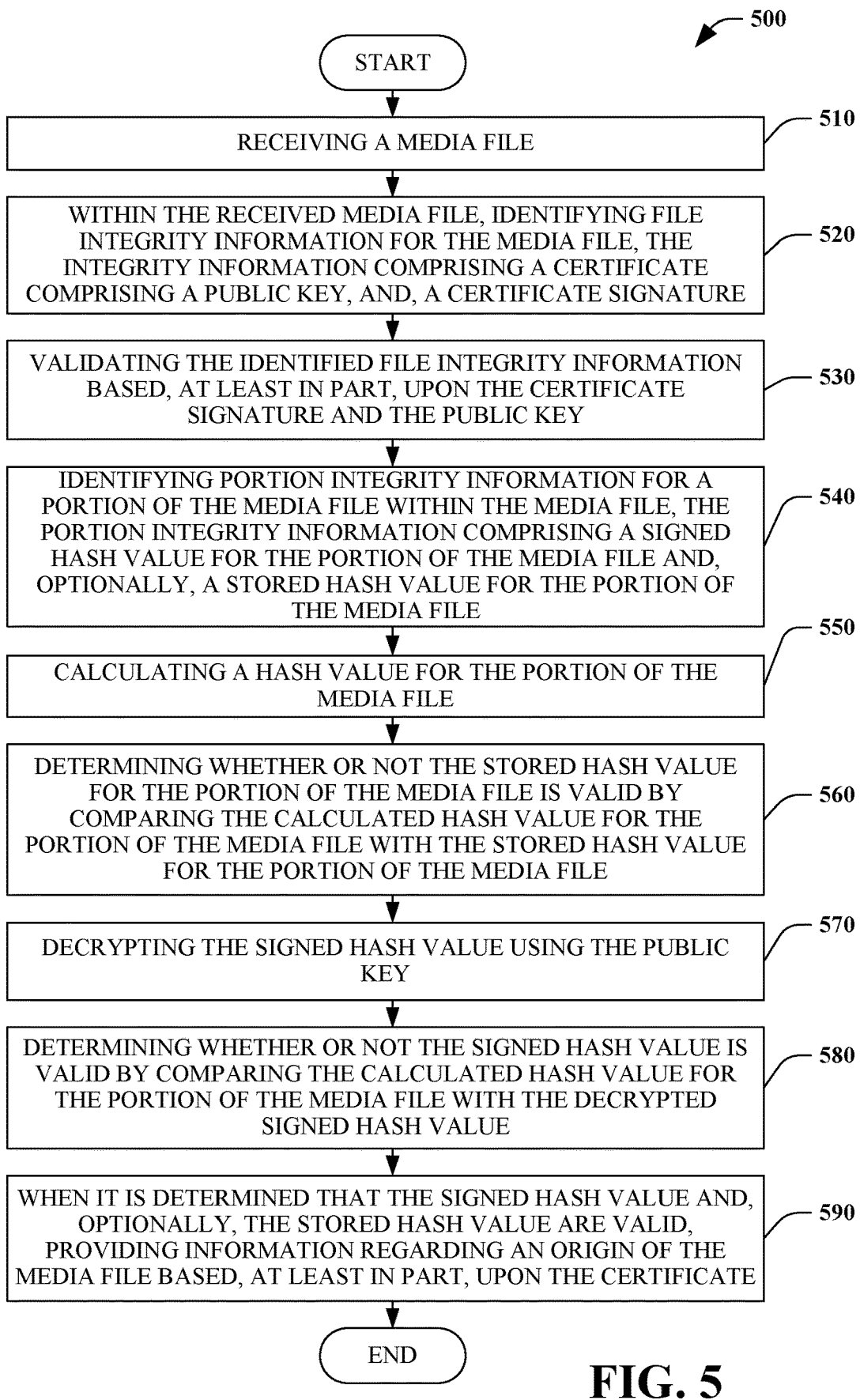
FIG. 5 is a flow chart that illustrates a method of verifying media integrity of a media file.

Turning to FIG. 5, a method 500 of verifying media integrity of a media file is illustrated. In some embodiments, the method 500 is performed by the media integrity verification system 300.

At 510, a media file is received. In some embodiments, one or more file integrity boxes can be checked to determine whether particular integrity system(s) are supported by the playback pipeline. If none are supported, no further processing occurs. If one or more file integrity system(s) are supported, a particular integrity system is selected.

At 520, within the received media file, file integrity information for the media file is identified. The integrity information comprises a certificate comprising a public key, and, a certificate signature.

At 530, the identified file integrity information is validated based, at least in part, upon the certificate signature and the public key. In some embodiments, the file integrity information is determined to be invalid, no further processing occurs.

At 540, portion integrity information for a portion of the media file is identified within the media file. The portion integrity information comprises, a signed hash value for the portion of the media file, and, optionally, a stored hash value for the portion of the media file. At 550, a hash value for the portion of the media file is calculated. At 560, a determination is made as to whether or not the stored hash value for the portion of the media file is valid by comparing the calculated hash value for the portion of the media file with the stored hash value for the portion of the media file.

At 570, the signed hash value is decrypted using the public key. At 580, a determination is made as to whether or not the signed hash value is valid by comparing the calculated hash value for the portion of the media file with the decrypted signed hash value. At 590, when it is determined that the signed hash value and, optionally, the stored hash value are valid, information regarding an origin of the media file is provided based, at least in part, upon the certificate (e.g., retrieved from the trusted certificate authority 140).

Figure 6:
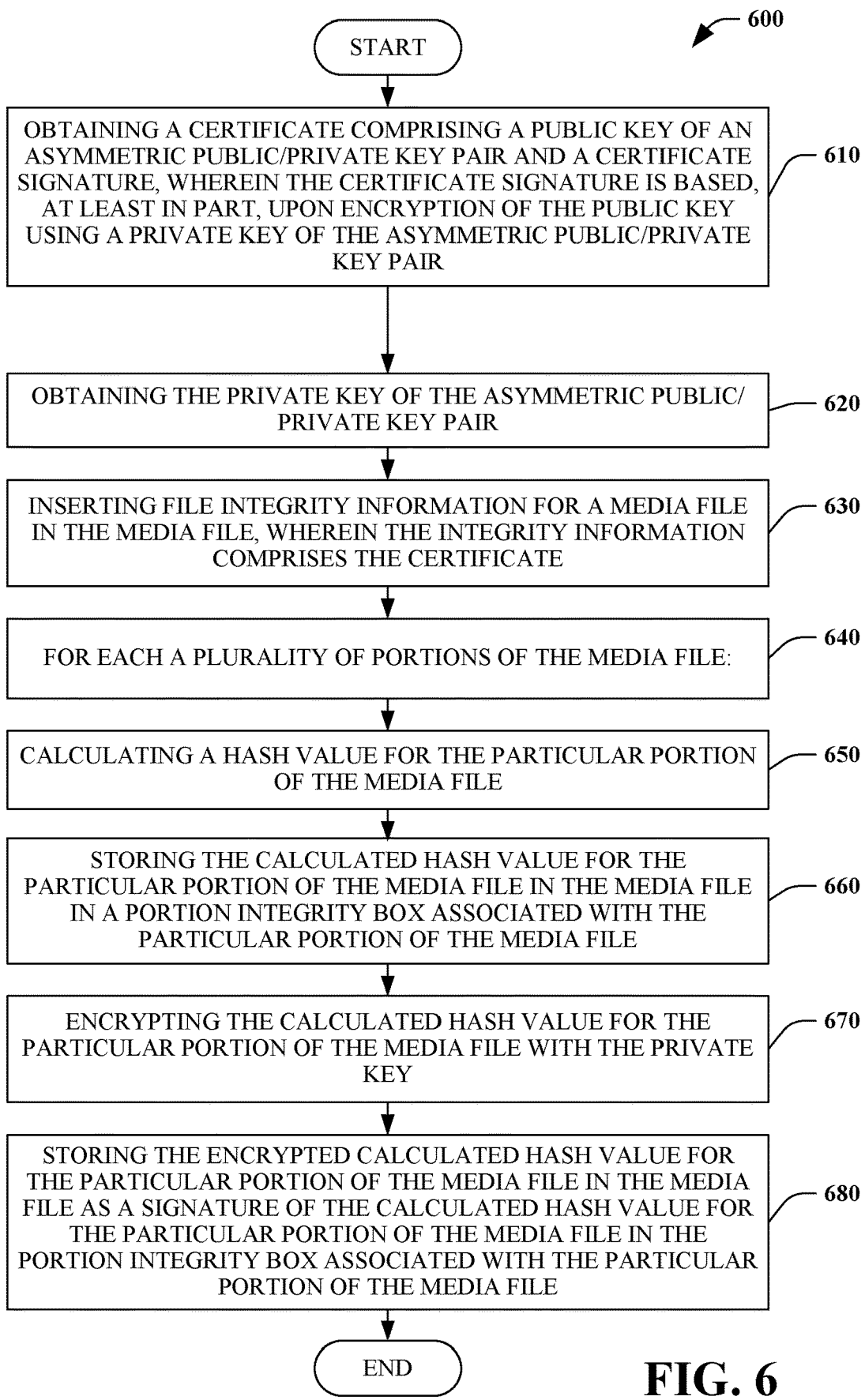
FIG. 6 is a flow chart that illustrates a method of asserting integrity of a media file.

Next, referring to FIG. 6, a method of asserting integrity of a media file 600 is illustrated. In some embodiments, the method 600 is performed by the media integrity assertion component 110.

In some embodiments, an integrity system of a plurality of integrity systems can be determined/decided/selected. Selection of the integrity system can determine one or more values of the file integrity box, for example, hashing algorithm, signing algorithm, certificate type, certificate size, certificate, per sample hash size, per sample signature size, and/or per sample data size.

At 610, a certificate comprising a public key of an asymmetric public/private key pair and a certificate signature is obtained. The certificate signature is based, at least in part, upon encryption of the public key using a private key of the asymmetric public/private key pair. At 620, the private key of the asymmetric public/private key pair is obtained.

At 630, file integrity information for a media file is inserted into the media file. The integrity information can comprise the certificate.

At 640, for each of a plurality of portions of the media file, acts 650, 660, 670, and/or 680 are performed. At 650, a hash value for the particular portion of the media file is calculated. At 660, the calculated hash value for the particular portion of the media file is stored in the media file (e.g., in a portion integrity box associated with the particular portion of the media file).

At 670, the calculated hash value for the particular portion of the media file is encrypted with the private key. At 680, the encrypted calculated hash value for the particular portion of the media file is stored in the media file as a signature of the calculated hash value for the particular portion of the media file (e.g., in the portion integrity box associated with the particular portion of the media file).

Figure 7:
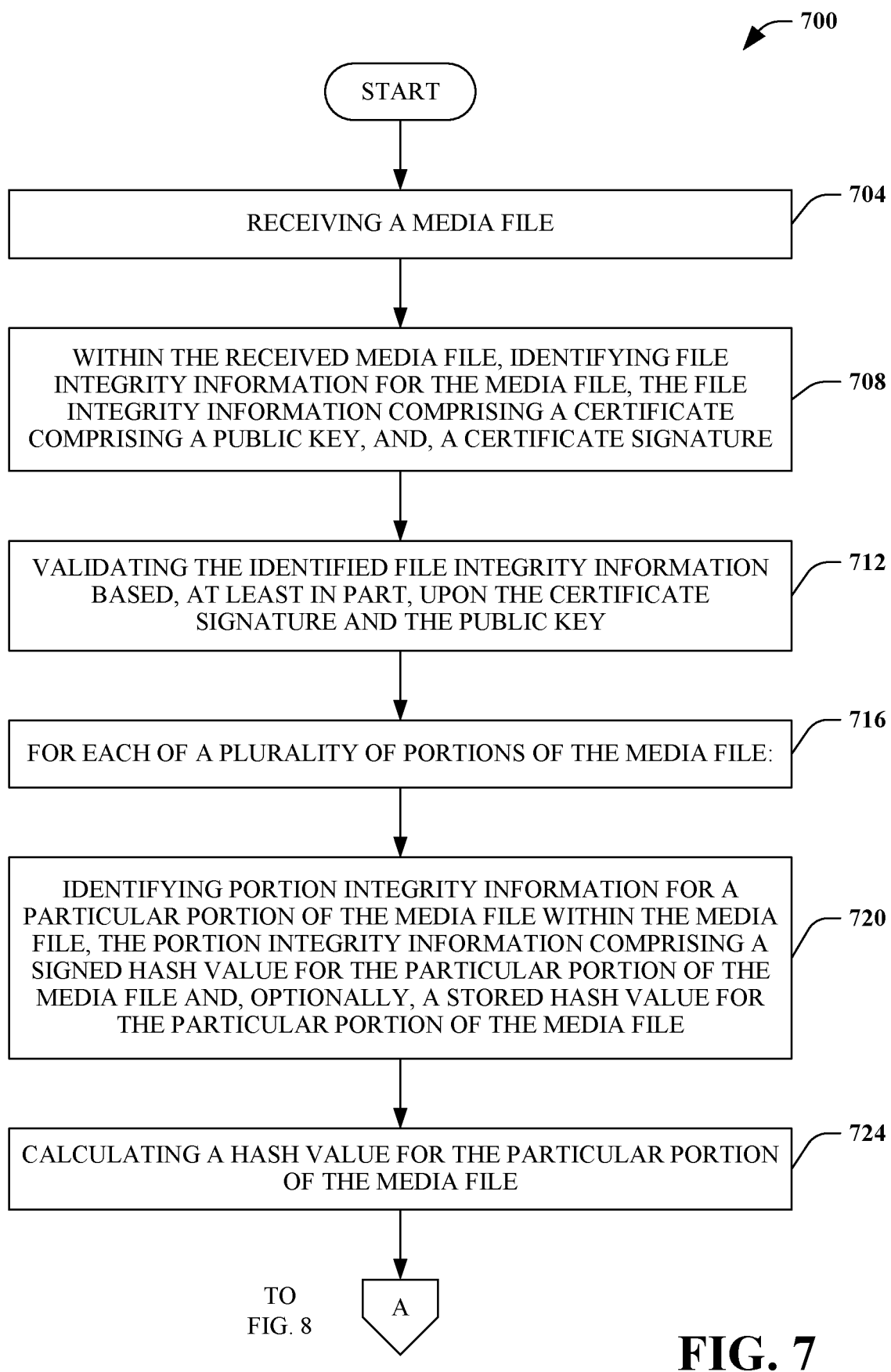
FIGS. 7 and 8 are flow charts that illustrate a method of verifying media integrity of a media file.
Figure 8:
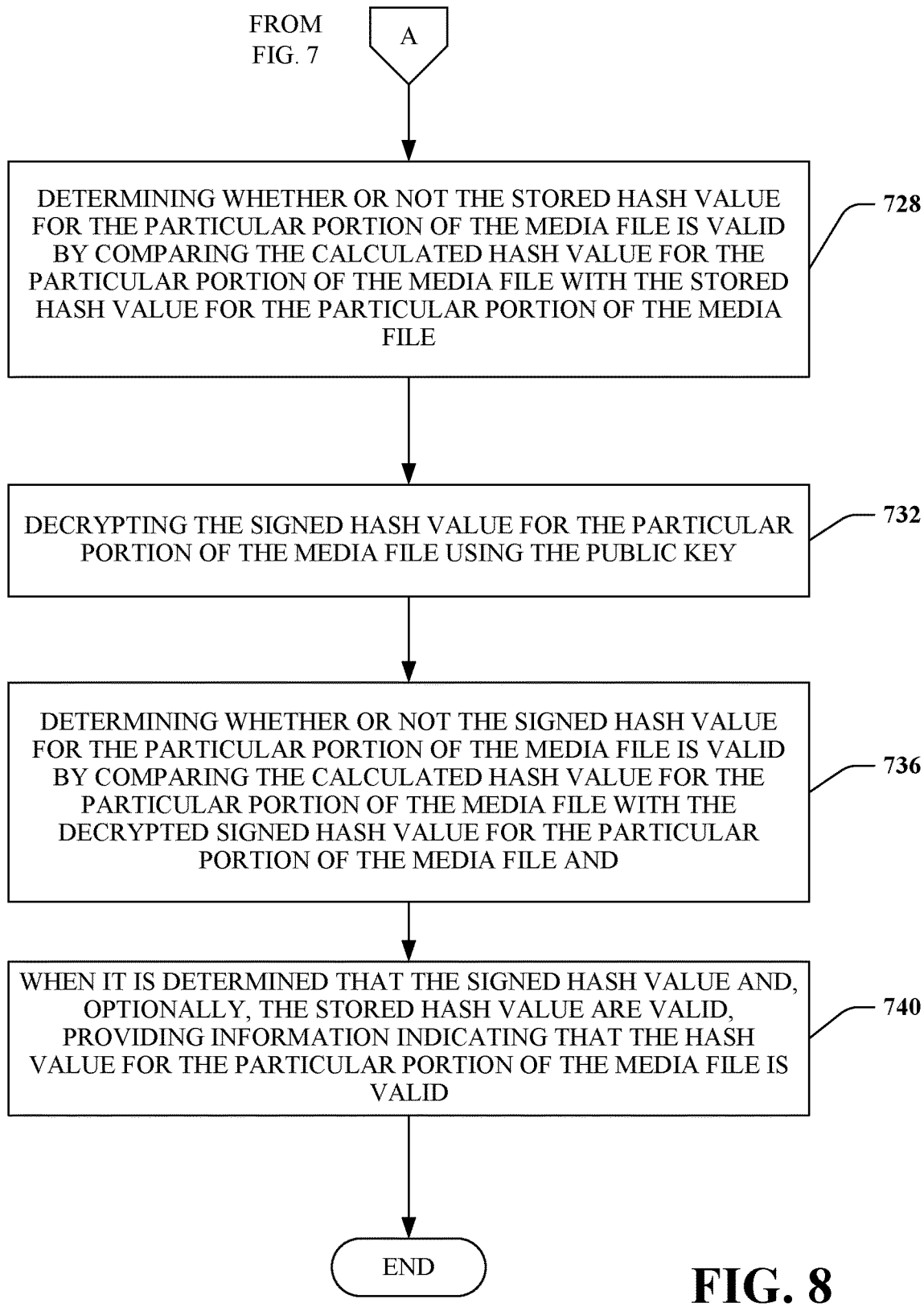

Turning to FIGS. 7 and 8, a method 700 of verifying media integrity of a media file is illustrated. In some embodiments, the method 700 is performed by the media integrity verification system 300.

At 704, a media file is received. In some embodiments, one or more file integrity boxes can be checked to determine whether particular integrity system(s) are supported by the playback pipeline. If none are supported, no further processing occurs. If one or more file integrity system(s) are supported, a particular integrity system is selected.

At 708, within the received media file, file integrity information for the media file is identified. The file integrity information comprises a certificate comprising a public key, and, a certificate signature. At 712, the identified file integrity information is validated based, at least in part, upon the certificate signature and the public key.

At 716, for each of a plurality of portions of the media file, acts 720, 724, 728, 732, 736, and/or 740 are performed. At 720, a portion integrity information for a particular portion of the media file is identified within the media file. The portion integrity information comprises a signed hash value for the particular portion of the media file, and, optionally, a stored hash value for the particular portion of the media file.

At 724, a hash value for the particular portion of the media file is calculated. At 728, a determination is made as to whether or not the stored hash value for the particular portion of the media file is valid by comparing the calculated hash value for the particular portion of the media file with the stored hash value for the particular portion of the media file.

At 732, the signed hash value for the particular portion of the media file is decrypted using the public key. At 736, a determination is made as to whether or not the signed hash value for the particular portion of the media file is valid by comparing the calculated hash value for the particular portion of the media file with the decrypted signed hash value for the particular portion of the media file. At 740, when it is determined that the signed hash value and, optionally, the stored hash value are valid, information is provided indicating that the hash value for the particular portion of the media file is valid.

Figure 9:
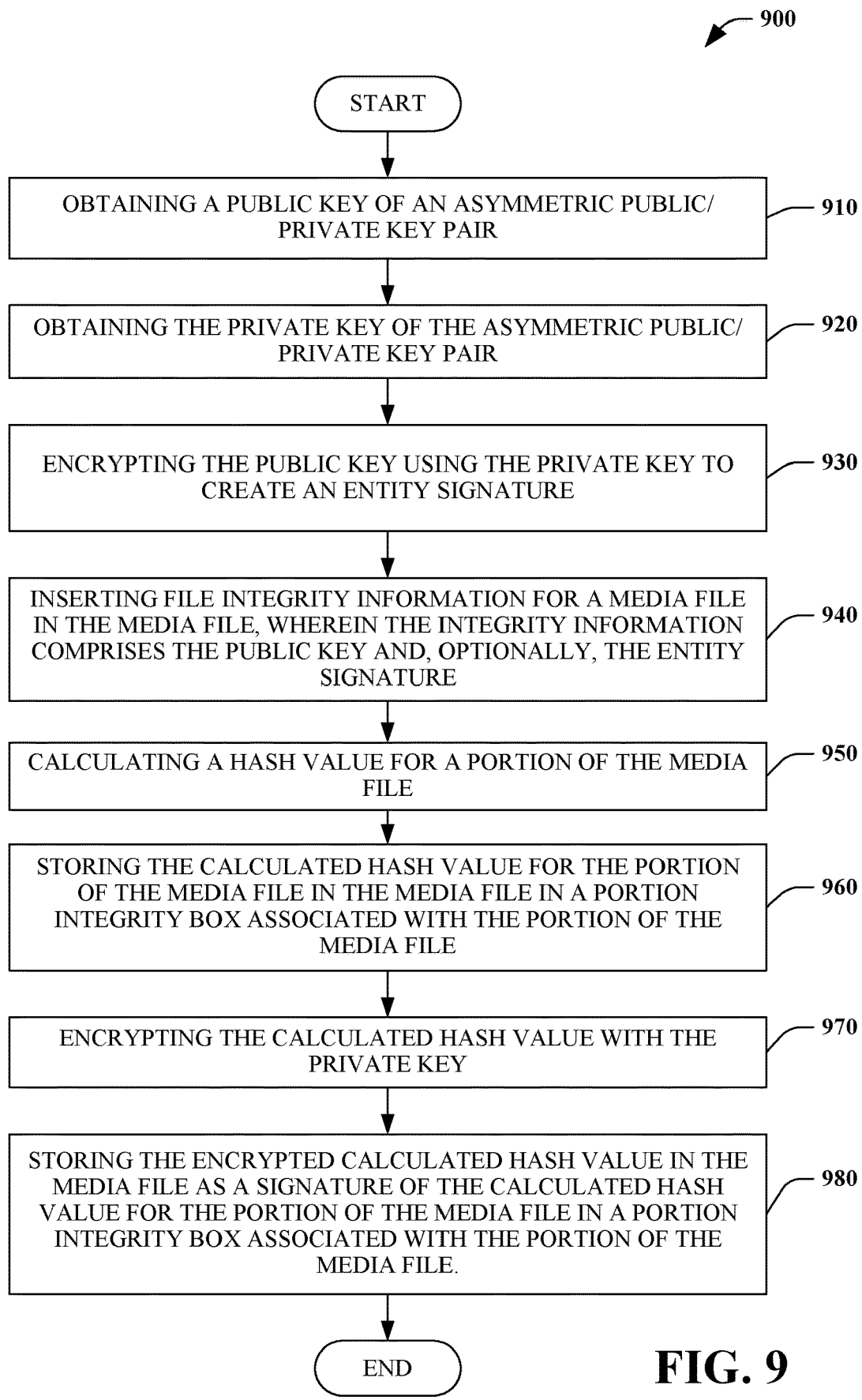
FIG. 9 is a flow chart that illustrates a method of asserting integrity of a media file.

Next, referring to FIG. 9, a method 900 of asserting integrity of a media file is illustrated. In some embodiments, the method 900 is performed by the media integrity assertion component 110.

In some embodiments, an integrity system of a plurality of integrity systems can be determined/decided/selected. Selection of the integrity system can determine one or more values of the file integrity box, for example, hashing algorithm, signing algorithm, certificate type, certificate size, certificate, per sample hash size, per sample signature size, and/or per sample data size.

At 910, a public key of an asymmetric public/private key pair is obtained. At 920, the private key of the asymmetric public/private key pair is obtained.

At 930, the public key is encrypted using the private key to create an entity signature. At 940, file integrity information for a media file is inserted in the media file. The integrity information can comprise the public key and, optionally, the entity signature.

At 950, a hash value for a portion of the media file is calculated. At 960, the calculated hash value for the portion of the media file is stored in the media file (e.g., in a portion integrity box associated with the portion of the media file).

At 970, the calculated hash value is encrypted with the private key. At 980, the encrypted calculated hash value is stored in the media file as a signature of the calculated hash value for the portion of the media file (e.g., in the portion integrity box associated with the portion of the media file).

Figure 10:
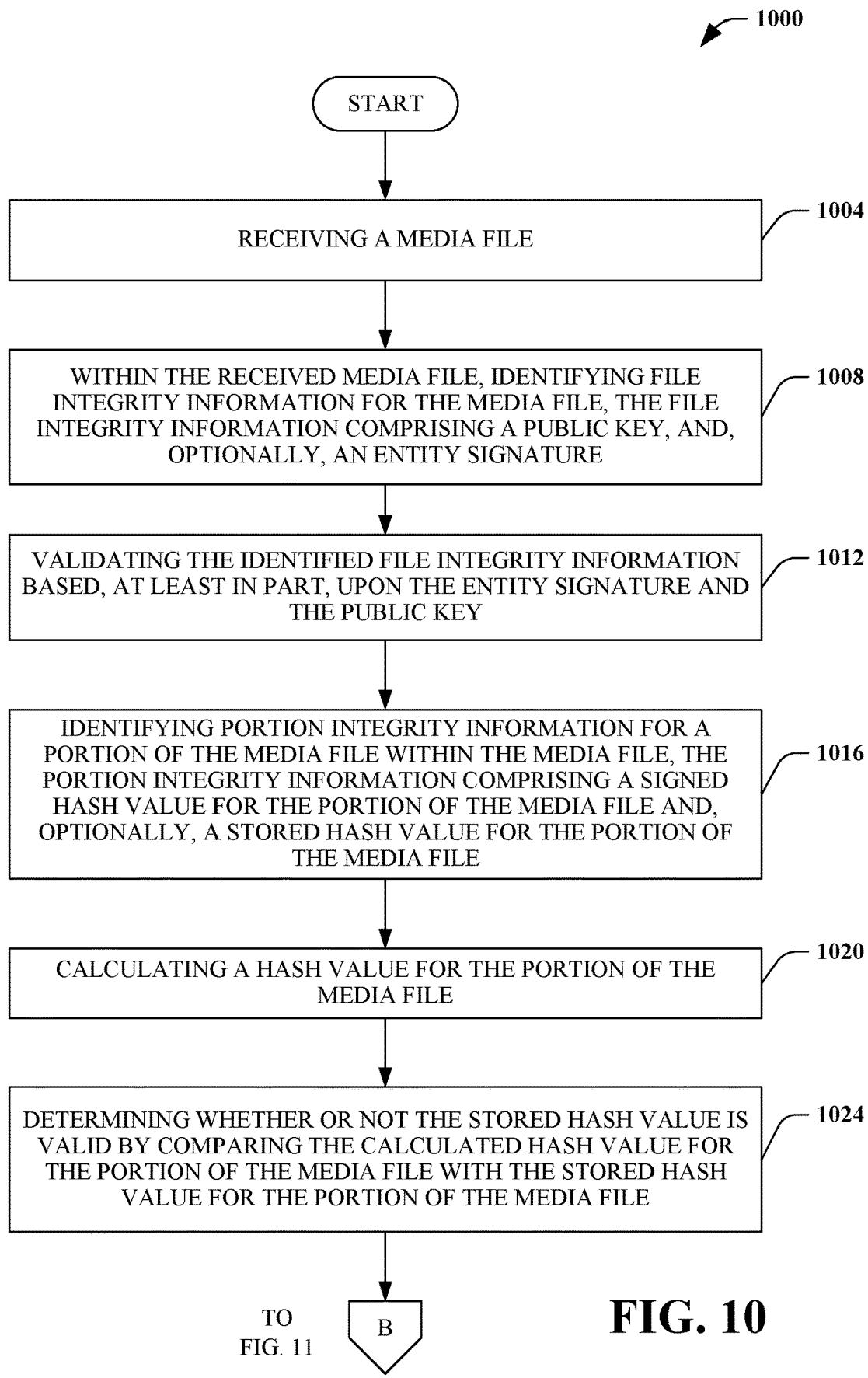
FIGS. 10 and 11 are flow charts that illustrate a method of verifying media integrity of a media file.
Figure 11:
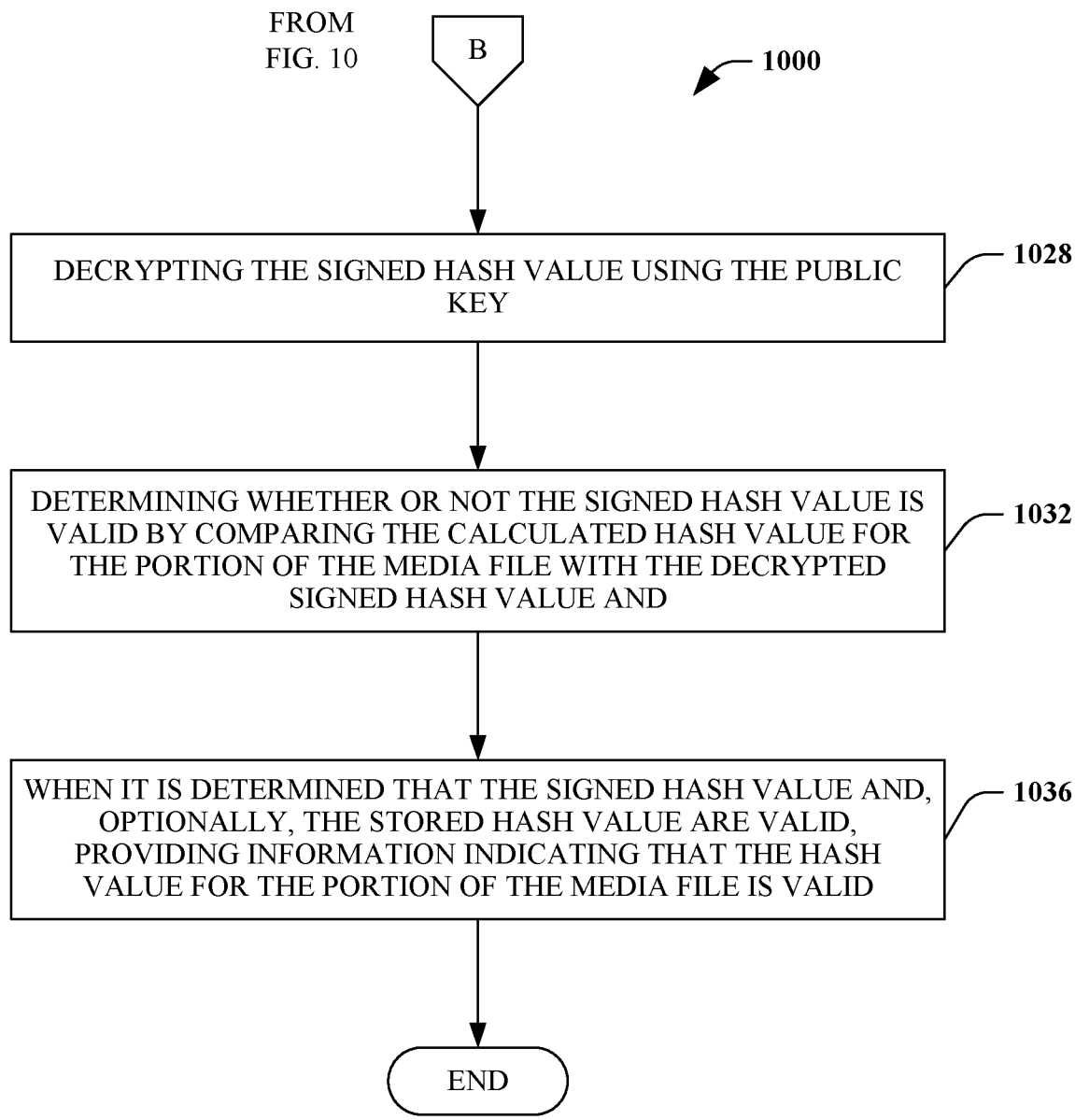

Turning to FIGS. 10 and 11, a method 1000 of verifying media integrity of a media file is illustrated. In some embodiments, the method 1000 is performed by the media integrity verification system 300.

At 1004, a media file is received. At 1008, within the received media file, file integrity information for the media file is identified. The file integrity information comprises a public key, and, optionally, an entity signature.

At 1012, the identified filed integrity information is validated based, at least in part, upon the entity signature and the public key. At 1016, portion integrity information for a portion of the media file is identified within the media file. The portion integrity information comprises a stored hash value for the portion of the media file and, optionally, a signed hash value for the portion of the media file.

At 1020, a hash value for the portion of the media file is calculated. At 1024, a determination is made as to whether or not the stored hash value is valid by comparing the calculated hash value for the portion of the media file with the stored hash value for the portion of the media file. At 1028, the signed hash value is decrypted using the public key. At 1032, a determination is made as to whether or not the signed hash value is valid by comparing the calculated hash value for the portion of the media file with the decrypted signed hash value. At 1036, when it is determined that the signed hash value and, optionally, the stored hash value are valid, information is provided indicating that the hash value for the portion of the media file is valid.

Figure 12:
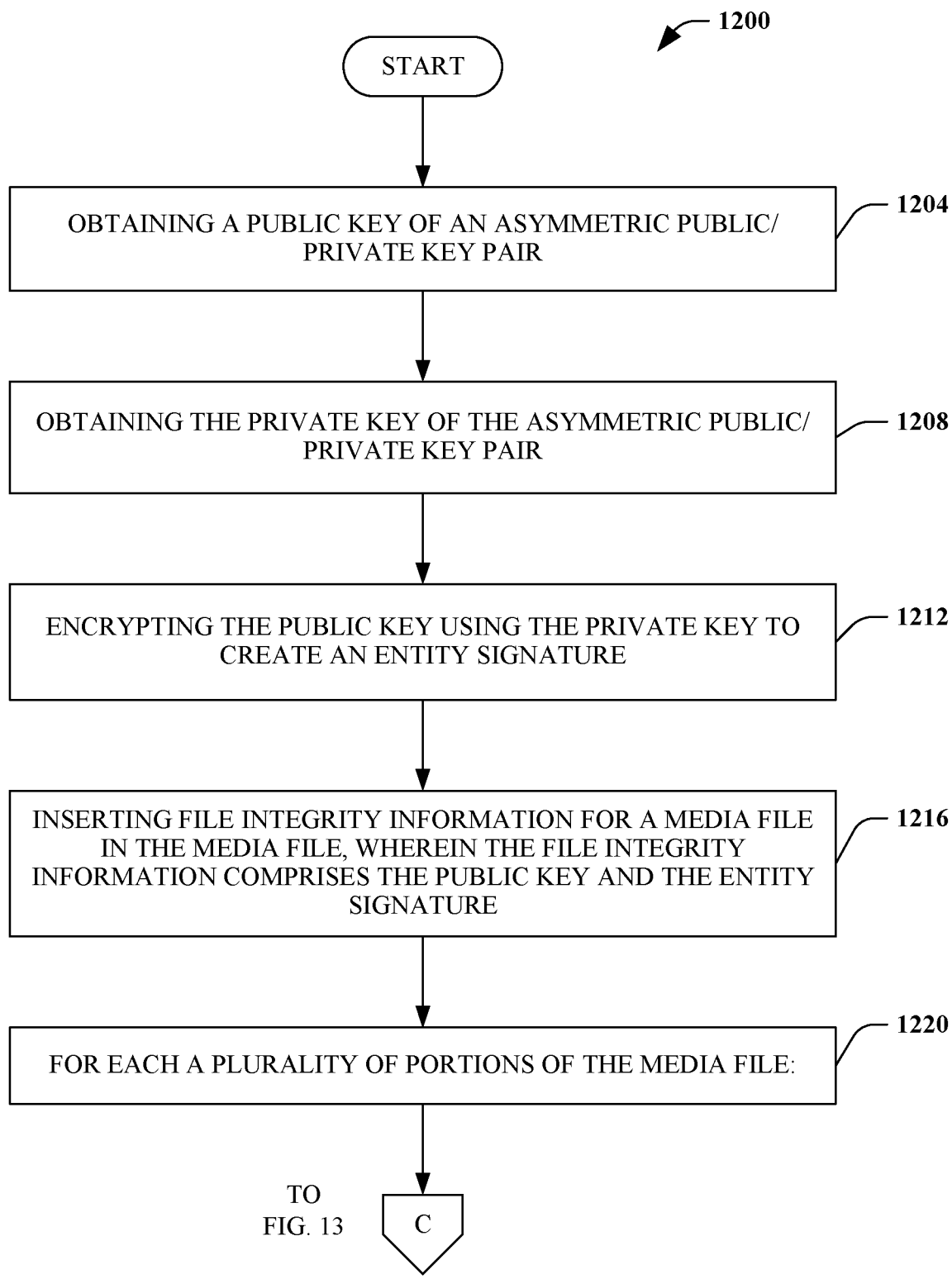
FIGS. 12 and 13 are flow charts a method of asserting integrity of a media file.
Figure 13:
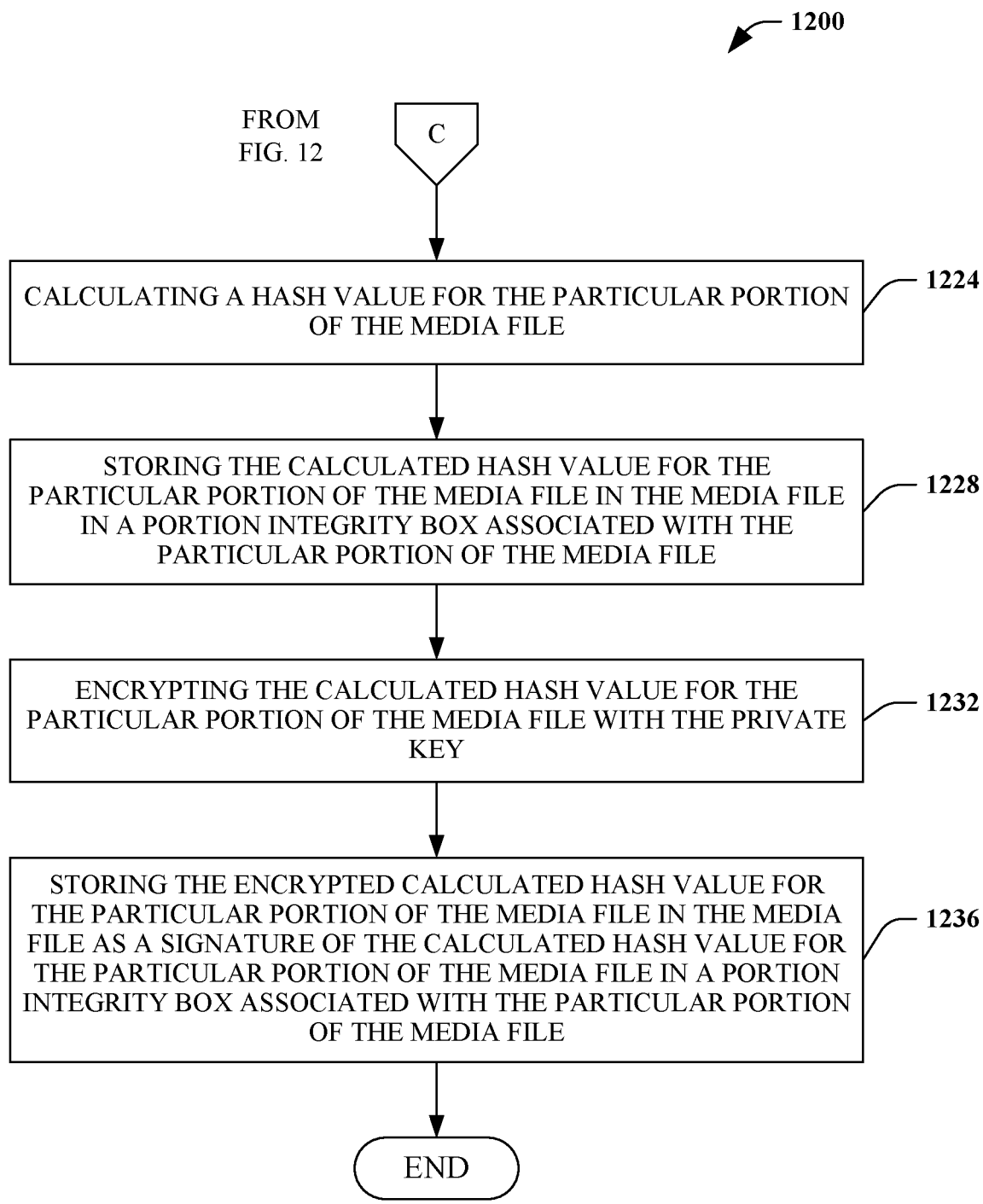

Next, referring to FIGS. 12 and 13, a method 1200 of asserting integrity of a media file is illustrated. In some embodiments, the method 1200 is performed by the media integrity assertion component 110.

In some embodiments, an integrity system of a plurality of integrity systems can be determined/decided/selected. Selection of the integrity system can determine one or more values of the file integrity box, for example, hashing algorithm, signing algorithm, certificate type, certificate size, certificate, per sample hash size, per sample signature size, and/or per sample data size.

At 1204, a public key of an asymmetric public/private key pair is obtained. At 1208, the private key of the asymmetric public/private key pair is obtained.

At 1212, the public key is encrypted using the private key to create an entity signature. At 1216, file integrity information for a media file is inserted in the media file. The file integrity information comprises the public key and the entity signature.

At 1220, for each of a plurality of portions (e.g., frames) of the media file, acts 1224, 1228, 1232, and/or 1236 are performed. At 1224, a hash value is calculated for the particular portion of the media file. At 1228, the calculated hash value for the particular portion of the media file is stored in the media file (e.g., in a portion integrity box associated with the particular portion of the media file).

At 1232, the calculated hash value for the particular portion of the media file is encrypted with the private key. At 1236, the encrypted calculated hash value for the particular portion of the media file is stored in the media file as a signature of the calculated hash value for the particular portion of the media file (e.g., in the portion integrity box associated with the particular portion of the media file).

Figure 14:
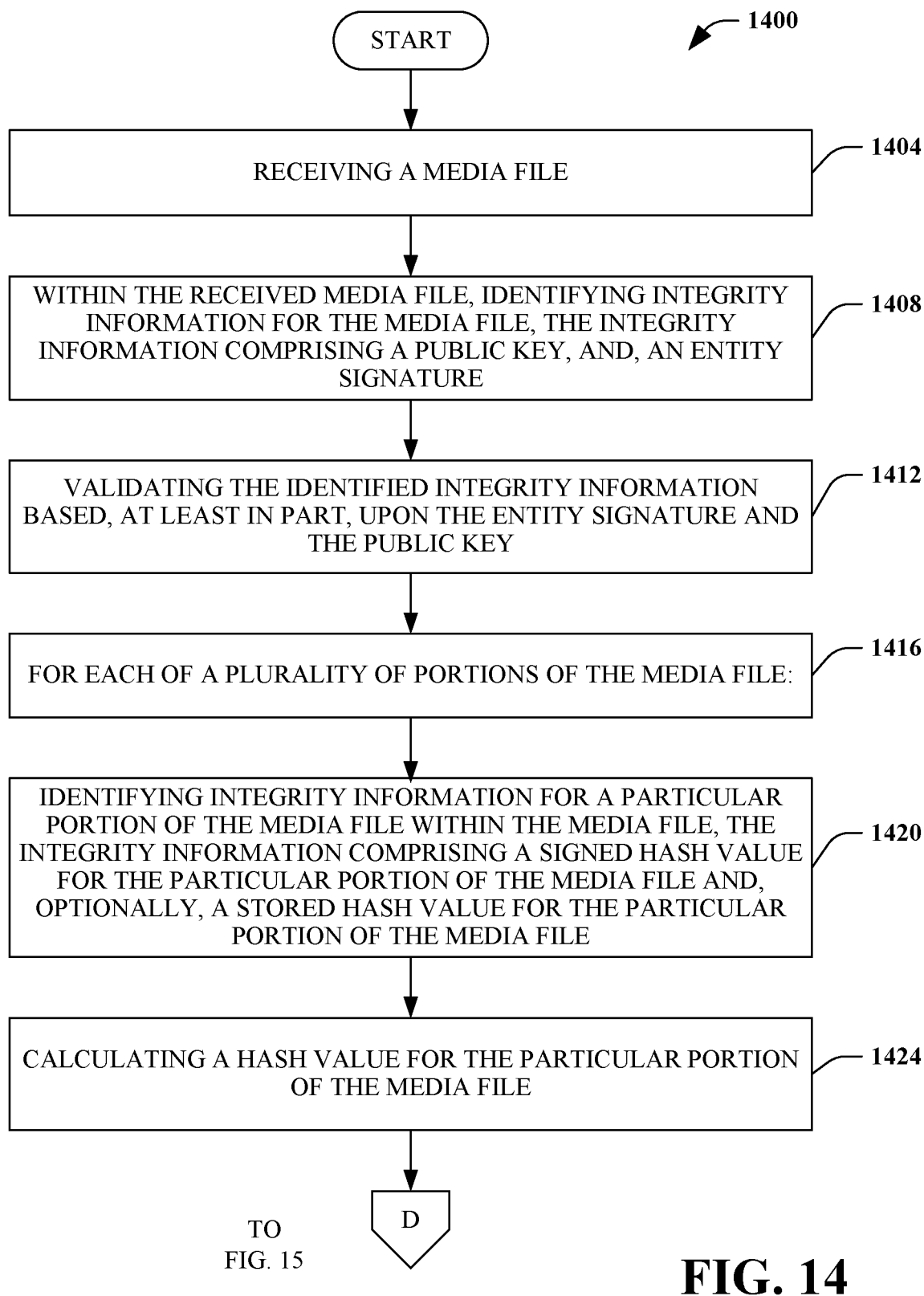
FIGS. 14 and 15 are flow charts that illustrate a method of verifying media integrity of a media file.
Figure 15:
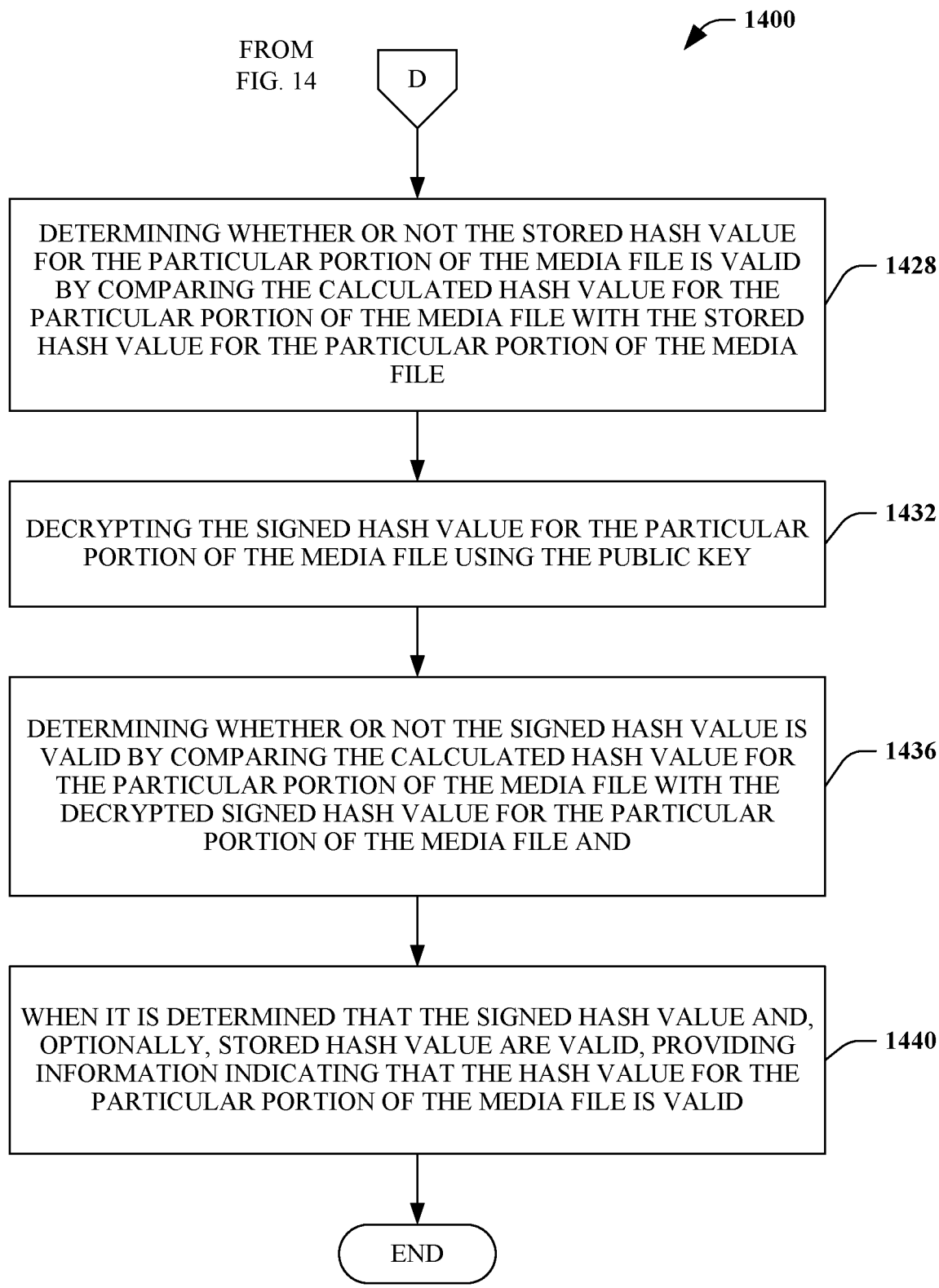

Turning to FIGS. 14 and 15, a method 1400 of verifying media integrity of a media file is illustrated. In some embodiments, the method 1400 is performed by the media integrity verification system 300.

At 1404, a media file is received. At 1408, within the received media file, integrity information for the media file is identified. The integrity information comprising a public key, and, an entity signature. At 1412, the identified integrity information is validated based, at least in part, upon the entity signature and the public key.

At 1416, for each of a plurality of portions of the media file, acts 1420, 1424, 1428, 1432, 1436, and/or 1440 are performed. At 1420, the method entails identifying integrity information for a particular portion of the media file within the media file. The integrity information comprising a signed hash value for the particular portion of the media file, and, optionally, a stored hash value for the particular portion of the media file.

At 1424, a hash value for the particular portion of the media file is calculated. At 1428, a determination is made as to whether or not the stored hash value for the particular portion of the media file is valid by comparing the calculated hash value for the particular portion of the media file with the stored hash value for the particular portion of the media file.

At 1432, the signed hash value for the particular portion of the media file is decrypted using the public key. At 1436, a determination is made as to whether or not the signed hash value is valid by comparing the calculated hash value for the particular portion of the media file with the decrypted signed hash value for the particular portion of the media file.

At 1440, when it is determined that the signed hash value and, optionally, stored hash value are valid, information is provided indicating that the hash value for the particular portion of the media file is valid.

Figure 16:
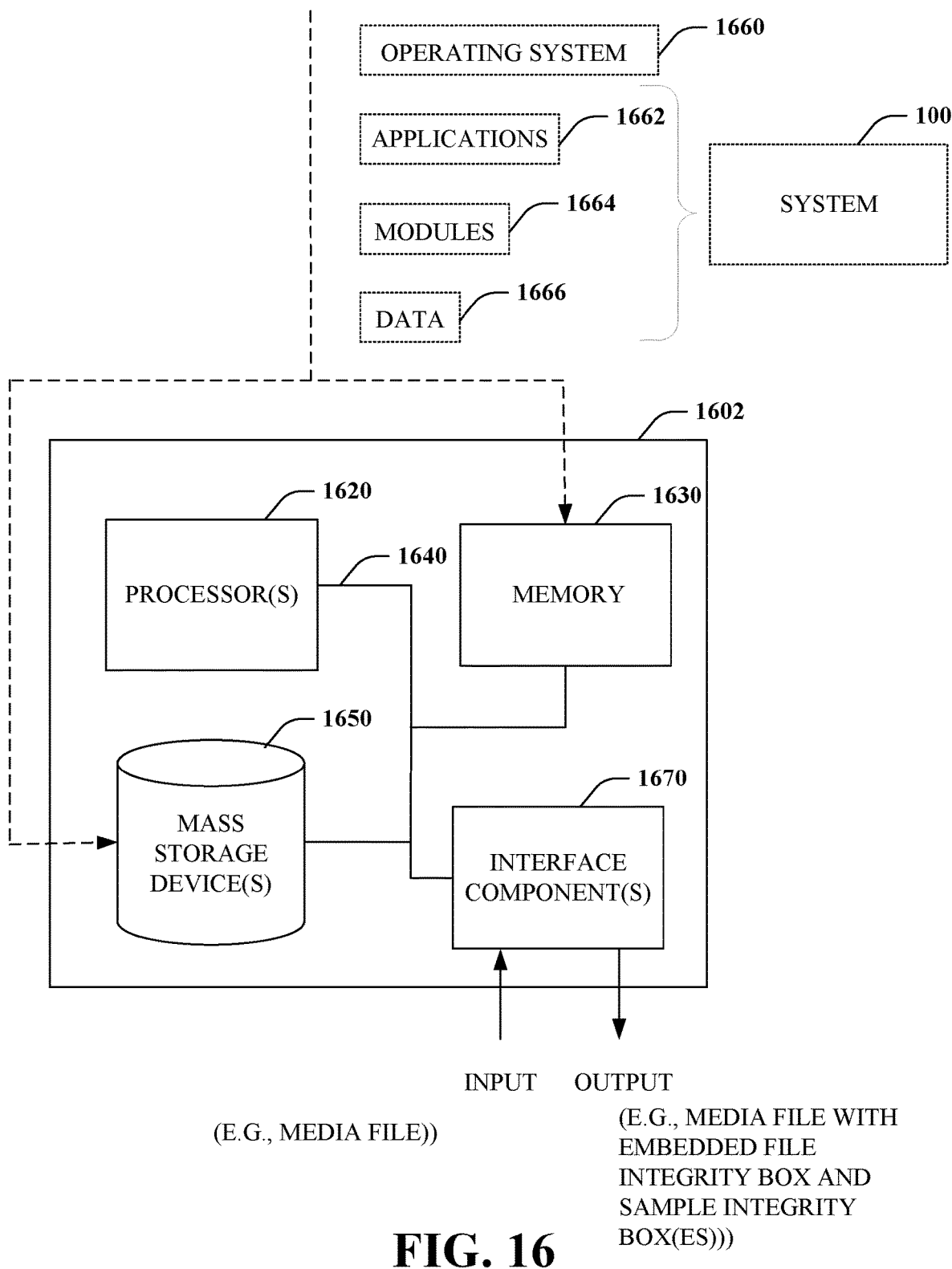
FIG. 16 is a functional block diagram that illustrates an exemplary computing system.

With reference to FIG. 16, illustrated is an example general-purpose computer or computing device 1602 (e.g., mobile phone, desktop, laptop, tablet, watch, server, handheld, programmable consumer or industrial electronics, set-top box, game system, compute node, etc.). For instance, the computing device 1602 may be used in a media integrity assertion component 110 and/or system 300.

The computer 1602 includes one or more processor(s) 1620, memory 1630, system bus 1640, mass storage device(s) 1650, and one or more interface components 1670. The system bus 1640 communicatively couples at least the above system constituents. However, it is to be appreciated that in its simplest form the computer 1602 can include one or more processors 1620 coupled to memory 1630 that execute various computer executable actions, instructions, and/or components stored in memory 1630. The instructions may be, for instance, instructions for implementing functionality described as being carried out by one or more components discussed above or instructions for implementing one or more of the methods described above.

The processor(s) 1620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1620 can be a graphics processor.

The computer 1602 can include or otherwise interact with a variety of computer-readable media to facilitate control of the computer 1602 to implement one or more aspects of the claimed subject matter. The computer-readable media can be any available media that can be accessed by the computer 1602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1602.

Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1630 and mass storage device(s) 1650 are examples of computer-readable storage media. Depending on the exact configuration and type of computing device, memory 1630 may be volatile (e.g., RAM), non-volatile (e.g., ROM, flash memory, etc.) or some combination of the two. By way of example, the basic input/output system (BIOS), including basic routines to transfer information between elements within the computer 1602, such as during start-up, can be stored in nonvolatile memory, while volatile memory can act as external cache memory to facilitate processing by the processor(s) 1620, among other things.

Mass storage device(s) 1650 includes removable/non-removable, volatile/non-volatile computer storage media for storage of large amounts of data relative to the memory 1630. For example, mass storage device(s) 1650 includes, but is not limited to, one or more devices such as a magnetic or optical disk drive, floppy disk drive, flash memory, solid-state drive, or memory stick.

Memory 1630 and mass storage device(s) 1650 can include, or have stored therein, operating system 1660, one or more applications 1662, one or more program modules 1664, and data 1666. The operating system 1660 acts to control and allocate resources of the computer 1602. Applications 1662 include one or both of system and application software and can exploit management of resources by the operating system 1660 through program modules 1664 and data 1666 stored in memory 1630 and/or mass storage device (s) 1650 to perform one or more actions. Accordingly, applications 1662 can turn a general-purpose computer 1602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1662, and include one or more modules 1664 and data 1666 stored in memory and/or mass storage device(s) 1650 whose functionality can be realized when executed by one or more processor(s) 1620.

In some embodiments, the processor(s) 1620 can correspond to a system on a chip (SOC) or like architecture including, or in other words integrating, both hardware and software on a single integrated circuit substrate. Here, the processor(s) 1620 can include one or more processors as well as memory at least similar to processor(s) 1620 and memory 1630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1602 also includes one or more interface components 1670 that are communicatively coupled to the system bus 1640 and facilitate interaction with the computer 1602. By way of example, the interface component 1670 can be a port (e.g., serial, parallel, PCMCIA, USB, FireWire, etc.) or an interface card (e.g., sound, video, etc.) or the like. In one example implementation, the interface component 1670 can be embodied as a user input/output interface to enable a user to enter commands and information into the computer 1602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1670 can be embodied as an output peripheral interface to supply output to displays (e.g., LCD, LED, plasma, etc.), speakers, printers, and/or other computers, among other things. Still further yet, the interface component 1670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

Various examples are described above. Additional examples are described below. One example includes a media publishing system, comprising a computer comprising a processor and a memory having computer-executable instructions stored thereupon which, when executed by the processor, cause the computer to: obtain a certificate comprising a public key of an asymmetric public/private key pair and a certificate signature, obtain the private key of the asymmetric public/private key pair, and insert file integrity information for a media file in the media file, wherein the integrity information comprises the certificate. For each of a plurality of portions of the media file: calculate a hash value for the particular portion of the media file, store the calculated hash value for the particular portion of the media file in the media file in a portion integrity box associated with the particular portion of the media file, encrypt the calculated hash value for the particular portion of the media file with the private key, and store the encrypted calculated hash value for the particular portion of the media file in the media file as a signature of the calculated hash value for the particular portion of the media file in the portion integrity box associated with the particular portion of the media file.

Another example can include any of the above and/or below examples where the certificate signature is based, at least in part, upon encryption of the public key using a private key of the asymmetric public/private key pair.

Another example can include any of the above and/or below examples where the certificate comprises a secure sockets layer (SSL) certificate.

Another example can include any of the above and/or below examples where the certificate comprises an X.509 certificate.

Another example can include any of the above and/or below examples where the certificate comprises a component of a certificate chain structure.

Another example can include any of the above and/or below examples where the certificate signature is based, at least in part, upon encryption of the public key using the private key of the asymmetric public/private key pair.

Another example can include any of the above and/or below examples where encryption of the public key is perform based upon a cryptographic algorithm comprising at least one of Advanced Encryption Standard (AES), Data Encryption Standard (DES), Rivest-Shamir-Adleman (RSA), or Elliptic Curve Cryptography (ECC).

Another example includes a method of verifying media integrity of a media file, comprising: receiving a media file, within the received media file, identifying file integrity information for the media file, the file integrity information comprising a certificate comprising a public key, and, a certificate signature, and validating the identified file integrity information based, at least in part, upon the certificate signature and the public key. For each of a plurality of portions of the media file: identifying portion integrity information for a particular portion of the media file within the media file, the portion integrity information comprising a stored hash value for the particular portion of the media file and a signed hash value for the particular portion of the media file, calculating a hash value for the particular portion of the media file, determining whether or not the stored hash value for the particular portion of the media file is valid by comparing the calculated hash value for the particular portion of the media file with the stored hash value for the particular portion of the media file, decrypting the signed hash value for the particular portion of the media file using the public key, determining whether or not the signed hash value for the particular portion of the media file is valid by comparing the calculated hash value for the particular portion of the media file with the decrypted signed hash value for the particular portion of the media file, and when it is determined that the signed hash value and the stored hash value are valid, providing information indicating that the hash value for the particular portion of the media file is valid.

Another example can include any of the above and/or below examples where the certificate signature is based, at least in part, upon encryption of the public key using a private key of the asymmetric public/private key pair.

Another example can include any of the above and/or below examples where the certificate comprises a secure sockets layer (SSL) certificate.

Another example can include any of the above and/or below examples where the certificate comprises an X.509 certificate.

Another example can include any of the above and/or below examples where the certificate comprises a component of a certificate chain structure.

Another example can include any of the above and/or below examples where the certificate signature is based, at least in part, upon encryption of the public key using the private key of the asymmetric public/private key pair.

Another example can include any of the above and/or below examples where encryption of the public key is perform based upon a cryptographic algorithm comprising at least one of Advanced Encryption Standard (AES), Data Encryption Standard (DES), Rivest-Shamir-Adleman (RSA), or Elliptic Curve Cryptography (ECC).

Another example includes a computer storage medium storing computer-readable instructions that when executed cause a computing device to: obtain a certificate comprising a public key of an asymmetric public/private key pair and a certificate signature, obtain the private key of the asymmetric public/private key pair, and insert file integrity information for a media file in the media file, wherein the integrity information comprises the certificate. For each a plurality of portions of the media file: calculate a hash value for the particular portion of the media file, store the calculated hash value for the particular portion of the media file in the media file in a portion integrity box associated with the particular portion of the media file, encrypt the calculated hash value for the particular portion of the media file with the private key, and store the encrypted calculated hash value for the particular portion of the media file in the media file as a signature of the calculated hash value for the particular portion of the media file in the portion integrity box associated with the particular portion of the media file.

Another example can include any of the above and/or below examples where the certificate signature is based, at least in part, upon encryption of the public key using a private key of the asymmetric public/private key pair.

Another example can include any of the above and/or below examples where the certificate comprises a secure sockets layer (SSL) certificate.

Another example can include any of the above and/or below examples where the certificate comprises an X.509 certificate.

Another example can include any of the above and/or below examples where the certificate comprises a component of a certificate chain structure.

Another example can include any of the above and/or below examples where the certificate signature is based, at least in part, upon encryption of the public key using the private key of the asymmetric public/private key pair.

What is claimed is:

1. A method of validating media integrity of a media file, comprising:
    receiving the media file;
    identifying file integrity information for the media file, the file integrity information comprising a certificate that includes a public key and a certificate signature;
    validating the file integrity information based on at least one of the public key or the certificate signature;
    for each portion of the media file of a plurality of portions of the media file:
        identifying portion integrity information, stored in a portion integrity box adjacent to the portion of the media file such that a plurality of portion integrity boxes is interwoven with the plurality of portions of the media file, that includes:
            a stored hash value for a particular portion of the media file; and
            a signed hash value for the particular portion of the media file;
        producing a calculated hash value for the particular portion of the media file by calculating a hash value for the particular portion of the media file;
        determining that the calculated hash value matches the stored hash value;

producing a decrypted hash value for the particular portion of the media file by decrypting the signed hash value for the particular portion of the media file using the public key;
determining that the calculated hash value matches the decrypted hash value; and
based on determining that the calculated hash value matches the stored hash value and based on determining that the calculated hash value matches the decrypted hash value, providing validation information indicating that the particular portion of the media file has not been altered.

2. The method of claim 1, wherein the certificate signature is based on encryption of the public key using a private key of an asymmetric public/private key pair.

3. The method of claim 2, wherein the encryption of the public key is performed using a cryptographic algorithm comprising at least one of Advanced Encryption Standard (AES), Data Encryption Standard (DES), Rivest-Shamir-Adleman (RSA), or Elliptic Curve Cryptography (ECC).

4. The method of claim 1, wherein the certificate comprises a secure sockets layer (SSL) certificate.

5. The method of claim 1, wherein the certificate comprises an X.509 certificate.

6. The method of claim 1, wherein the certificate comprises a component of a certificate chain structure.

7. The method of claim 1, further comprising providing origin information indicating an origin of the media file based on the certificate.

8. A method of validating media integrity of a media file, comprising:
receiving the media file, the media file including a public key;
for a portion of the media file of a plurality of portions of the media file:
identifying portion integrity information, stored in a portion integrity box adjacent to the portion of the media file such that a plurality of portion integrity boxes is interwoven with the plurality of portions of the media file, that includes a signed hash value for the portion of the media file;
producing a calculated hash value for the portion of the media file by calculating a hash value for the portion of the media file;
producing a decrypted hash value for the portion of the media file by decrypting the signed hash value for the portion of the media file using the public key;
determining whether the calculated hash value matches the decrypted hash value; and
providing validation information based on the determining whether the calculated hash value matches the decrypted hash value.

9. The method of claim 8, wherein:
the calculated hash value matches the decrypted hash value; and
the validation information indicates that the portion of the media file has not been altered compared to a previous publication based on determining that the calculated hash value matches the decrypted hash value.

10. The method of claim 9, further comprising providing origin information indicating an origin of the media file.

11. The method of claim 8, wherein:
the calculated hash value does not match the decrypted hash value; and
the validation information indicates that the portion of the media file has been altered compared to a previous publication based on determining that the calculated hash value does not match the decrypted hash value.

12. The method of claim 8, further comprising:
identifying file integrity information for the media file, the file integrity information comprising a certificate that includes a certificate signature and the public key; and
validating the file integrity information based on at least one of the certificate signature or the public key.

13. The method of claim 12, wherein the certificate signature is based on encryption of the public key using a private key of an asymmetric public/private key pair.

14. The method of claim 12, wherein the certificate comprises a component of a certificate chain structure.

15. A method of validating media integrity of a media file, comprising:
receiving the media file;
for a portion of the media file of the plurality of portions of the media file:
identifying portion integrity information, stored in a portion integrity box adjacent to the portion of the media file such that a plurality of portion integrity boxes is interwoven with the plurality of portions of the media file, that includes a stored hash value for the portion of the media file;
producing a calculated hash value for the portion of the media file by calculating a hash value for the portion of the media file;
determining whether the calculated hash value matches the stored hash value; and
providing validation information based on the determining whether the calculated hash value matches the stored hash value.

16. The method of claim 15, wherein:
the calculated hash value matches the stored hash value; and
the validation information indicates that the portion of the media file has not been altered compared to a previous publication based on determining that the calculated hash value matches the stored hash value.

17. The method of claim 16, further comprising providing origin information indicating an origin of the media file.

18. The method of claim 15, wherein:
the calculated hash value does not match the stored hash value; and
the validation information indicates that the portion of the media file has been altered compared to a previous publication based on determining that the calculated hash value does not match the stored hash value.

19. The method of claim 15, further comprising:
identifying file integrity information for the media file, the file integrity information comprising a certificate that includes a certificate signature and a public key; and
validating the file integrity information based on at least one of the certificate signature or the public key.

20. The method of claim 19, wherein the certificate signature is based on encryption of the public key using a private key of an asymmetric public/private key pair.

* * * * *